United States Patent Office

3,268,458
Patented August 23, 1966

3,268,458
METHOD OF MAKING MICROPOROUS
RUBBER SHEET MATERIAL
Howard J. Strauss, Rockford, Ill., and Ernest Weiss, Mercer County, N.J., assignors to ESB-Reeves Corporation, a corporation of Delaware
No Drawing. Filed Feb. 4, 1963, Ser. No. 256,135
2 Claims. (Cl. 260—2.5)

This invention relates to a method of making microporous rubber sheet material and particularly microporous rubber sheet material having substantial strength for use in girdles, surgical bandages and the like.

There are many uses for a resilient rubber material which is impermeable to liquids yet permeable to air. Chemically blown sponge cannot be used for these purposes. Depending on the process employed in its manufacture, most of its cells are either closed rendering the rubber substantially impermeable to the passage of air or the cells may be interconnected, in which case the cells and the channels linking the cells have invariably such a large diameter that the rubber is readily permeable to liquids. In foam rubber, the cells are also interconnected but even in foam rubber the pore size is of a magnitude which results in easy permeation of liquids.

The present invention provides an improved microporous rubber sheet of increased strength and uniform porosity, characterized by a system of interconnected pores of extremely small pore size. It avoids the need for expensive equipment as required in breaking down rubber on a mill and avoids agglomeration of the starch. It also enables sheet material of endless form such as seamless girdles to be produced. In accordance with the present invention, there is provided a method of making microporous rubber sheet material wherein a starch is dispersed in water and the resulting starch dispersion is added to a dispersion of rubber particles in water. The rubber and starch dispersions are mixed with a delayed action coagulant while minimizing foaming of the mixture. The mixture is applied to a surface as by spreading and permitted to gel to an irreversible sheet having a skeleton of rubber. The sheet is then dried at a temperature which is lower than that at which the starch is gelatinized in order to avoid cracking of the skeleton of rubber gel. The sheet is thereafter subjected to a temperature adequate to cure or vulcanize the rubber. The starch in the cured rubber sheet is then subjected to a swelling operation after which the starch and any moisture is removed from the rubber sheet to form pores therein. The gelling of the latex is particularly important in order to obtain the skeleton of rubber gel and it is likewise important that the rubber gel skeleton not be damaged while the sheet is drying and before the sheet has been cured or vulcanized.

In a specific example of the present invention, an improved porous sheet of considerable strength was made by dispersing a potato starch in water containing suitable dispersing agents, and then the starch dispersion was added to a rubber latex which had been compounded for subsequent cure. The starch may be of any vegetable source such as corn, rice, wheat and is not limited to potato starch. It is essential that the starch be dispersed in water prior to adding it to the latex otherwise a lumpy mixture will result when the starch is added to the latex. The compounding of the rubber latex for subsequent cure may be done either before or after the starch has been added.

In a typical example 100 g. of potato starch was dispersed, with rapid stirring, in a mixture containing 0.5 g. Darvan #1 which is the sodium salt of a polymerized alkyl naphthaline sulfonic acid having a short alkyl chain, 0.5 g. Darvan #7—a proprietary dispersing agent of the polyelectrolyte type—and 99 g. of water. The resulting dispersion was then added, while stirring, to 173 g. of a rubber latex mixture, containing 100 g. of rubber solids with the sulphur, zinc oxide and accelerators necessary to obtain a cured rubber. To produce gelling of the mixture for a formation of a skeleton of rubber there was added 7.5 g. of 20% aqueous dispersion of sodium silicofluoride (a delayed action coagulant) and stirring was continued for another minute with care being taken throughout the stirring operation to hold the foaming, i.e., the drawing in of air from the atmosphere, to a minimum. This is done by agitating the latex in such manner as not to stir air into it and/or by addition of an antifoamant, e.g., silicone defoamants such as sold by Dow Corning Corporation.

The mixture was then poured onto a flat surface, such as an aluminum plate, and the mixture was spread to a uniform thickness by means of a doctor blade. After a period of about 4 minutes at room temperature, the mass gelled irreversibly. The resulting sheet was dried for several hours, for example overnight, in an oven maintained at a temperature of about 50° C. It is important to carry out this drying operation below the temperature at which starch is gelatinized otherwise the stresses set up by the gelling of the starch will cause severe cracking of the rubber gel skeleton which up to this time is quite weak. Once the sheet is dried, the temperature may be raised so as to obtain cure or vulcanization of the rubber. For example, a sheet about 1/8" thick was cured in 12 minutes at a temperature of about 140° C.

After the sheet has been cured or vulcanized, the starch is then subjected to a swelling operation to increase the size of the openings between adjacent pores in the sheet. The pores are formed in the sheet by removal of the starch and by removal of water. In order to obtain porosity, the sheet preferably is subjected to mechanical rolling to improve communication of the starch particles followed by immersion of the sheet for two hours in boiling water. As a result, in one typical example of the invention, the sheet increased in size by 25% in every direction, the area swelling about 56.25%. The sheet is then subjected to degradation of the starch by methods which are not destructive of the rubber. This can be accomplished either by an acid treatment (two hours in boiling 2% sulfuric acid) or by enzymatic degradation (24 hours at 50° C. in a 5% slurry of diastase, trypsin or pepsine). Enzymatic degradation is more costly and time consuming but it results in a particularly soft flexible end product. During degradation the sheet decreases in size due to the removal of the pore forming agent returning to slightly more (about 3%) than its original cured dimensions.

The sheet is then rinsed thoroughly in water to remove the acid or enzyme and the decomposition products of the starch. The rubber sheet material is then dried with care being taken to avoid too rapid drying which might result in surface cracking due to the action of rapidly escaping vapor from the inside of the sheet. A perfect surface was obtained when the sheets were dried for a period of about eight to twelve hours at a temperature of 50° C. During drying a small further shrinkage occurs and the final microporous rubber sheet is slightly less (about 3%) than its original cured dimensions.

As mentioned above, this method of producing microporous rubber sheet material is particularly suited for the manufacture of endless sheets such as microporous latex girdles. A form having the desired shape of the seamless girdle is dipped in a coagulant bath, e.g., an aqueous or alcoholic solution of calcium nitrate. The coagulant is allowed to dry on the form so as to provide a film on the surface. The form is then dipped in a mixture described above as containing the rubber and starch dispersions with the ingredients necessary for curing the rubber but without the coagulant. The form is then withdrawn from the mixture and the coating is permitted to gel irreversibly, forming a sheet having a skeleton of rubber. The water is then driven off at a temperature which does not create swelling or expansion of the starch and does not cause collapse of the rubber skeleton. This may be accomplished by drying the rubber coated form overnight at a temperature of about 40° C.–45° C. The rubber coating or sheet on the form may then be cured by heating it to a temperature of approximately 140° C. for a period of about ten minutes. The rubber girdle is then made microporous by subjecting it to the leaching operations as described above. Where it is deired to provide a girdle of increased thickness, the foregoing process may be repeated to build up additional layers of microporous rubber.

From the foregoing, it will be seen that the starch dispersion is in the order of 50% as follows:

|  | Percent Concentration | Dry Weight | Wet Weight |
| --- | --- | --- | --- |
| Water | | | 95.0 |
| Darvan #1 | 10 | 0.25 | 2.5 |
| Darvan #7 | 10 | 0.25 | 2.5 |
| Potato Starch | | 100.00 | 100.0 |
| Total | | 100.50 | 200.0 |

Suitable dispersing agents for the mixture are Darvan #1 and #7 sold by R. I. Vanderbilt Company of New York City or Daxad #11 and #30 sold by Dewey & Almy Company of Cambridge, Massachusetts. While the exact composition of these dispersing agents is not known, it is believed that Darvan #1 and Daxad #11 are in the nature of sodium salts of polymerized alkyl naphthalene sulfonic acids having short alkyl chains and that Darvan #7 and Daxad #30 are polyectrolytes. The natural latex of commerce contains about 60 to 63% total solids. The latex may be used at this concentration for spreading. For dipping, the concentration may be reduced (by the addition of water) from anywhere from between 40 and 60% depending on the desired viscosity. For spreading, the concentration should be somewhat higher for example from 55 to 63%. The rubber may be cured by including in the latex mixture sulphur in a 50–70% aqueous dispersion, zinc oxide in a 40–60% aqueous dispersion and suitable accelerators such as zinc mercaptobenzothiazole, zinc diethyl dithiocarbamate or "Setsit 5" sold by R. T. Vanderbilt, a water-soluble activated dithiocarbamate.

Where the mixture is to be spread, the coagulants are of the delayed action type such as a 20% dispersion of potassium silicofluoride or a 20% dispersion of sodium silicofluoride. The amount of these coagulants used depends on the stability of the latex and the temperature. The gelling takes place at room temperature or somewhat higher and the temperature should not be high enough to gelatinize the starch, the upper limit of temperature being in the order of 40° C. A more stable latex requires more coagulant and a higher temperature calls for the use of less coagulant. The usual amounts used are about 1 to 2.5 parts potassium silicofluoride (dry) per 100 parts rubber (dry). Potassium silicofluoride is preferred as a partial or full replacement for sodium silicofluoride in hot weather since $K_2SiF_6$ is less soluble and contains less $SiF_6$—hence it is less active. The usual amounts used are about 1 to 2 parts $Na_2SiF_6$ (dry) per 100 parts rubber (dry). For dipping, instantaneous coagulants are preferred such as calcium nitrate, magnesium acetate, aluminum sulphate and zinc chloride used in the form of aqueous or alcoholic solutions. In general, the drying temperature for the sheets is in the range of 40° C. to 50° C. and the curing temperature for the sheets is in the range of 100° C. to 150° C.

If it is desired that the microporous rubber sheet be supported on a fabric backing in the end product, the fabric may first be placed over the support or form before the rubber and starch dispersions and coagulant are applied to the form. The remainder of the process producing the microporous sheet will remain the same as described above. While the term rubber has been used herein and also in the claims, it is to be understood that this term is intended to include not only natural latex but also equivalent dispersions of synthetic elastomeric materials, e.g., styrene-butadiene copolymer latex, polychloroprene latex, etc.

What is claimed is:

1. The method of making microporous rubber sheet material which comprises dispersing a vegetable starch in water, adding the resulting starch dispersion to a rubber latex, mixing the latex and starch dispersion with an aqueous dispersion from the group of sodium silicofluoride and potassium silicofluoride while minimizing foaming of the mixture, spreading the mixture on a surface and permitting the mixture to gel irreversibly to form a sheet having a skeleton of rubber, drying the sheet at a temperature below that at which the starch is gelatinized to avoid cracking of the skeleton of rubber gel, thereafter curing the rubber in the sheet, subjecting the rubber sheet to mechanical rolling to improve communication of the starch particles, boiling the rubber sheet in water, removing the starch from the rubber sheet, and drying the rubber sheet at a temperature and rate which permits the vapor from the inside of the sheet to escape slowly in avoidance of surface cracking of the resulting microporous rubber sheet.

2. The method of making microporous rubber sheet material which comprises mixing a 50% starch dispersion with a 40–60% dispersion of rubber, mixing the rubber and starch dispersion with a 20% aqueous dispersion of sodium silicofluoride while minimizing foaming of the mixture, spreading the mixture on a surface and permitting the mixture to gel irreversibly to form a sheet having a skeleton of rubber, drying the sheet at a temperature below that at which the starch is gelatinized to avoid cracking of the skeleton of rubber gel, thereafter curing the rubber in the sheet, subjecting the rubber sheet to mechanical rolling to improve communication of the starch particles, boiling the rubber sheet in water, removing the starch from the rubber sheet and drying the rubber sheet at a temperature and rate which permits the vapor from the inside of the sheet to escape slowly in avoidance of surface cracking of the resulting microporous rubber sheet.

References Cited by the Examiner

UNITED STATES PATENTS

| | | | |
| --- | --- | --- | --- |
| 2,017,398 | 10/1935 | Faldini | 260—2.5 |
| 2,175,798 | 10/1939 | Hauser | 260—2.5 |
| 2,261,439 | 11/1941 | Kelly | 260—2.5 |
| 2,432,221 | 12/1947 | Wilson | 260—2.5 |

MURRAY TILLMAN, *Primary Examiner.*

SAMUEL H. BLECH, *Examiner.*

N. F. OBLON, *Assistant Examiner.*